United States Patent [19]

Berglindh et al.

[11] Patent Number: 5,324,717
[45] Date of Patent: Jun. 28, 1994

[54] THERAPEUTICAL COMPOSITION COMPRISING HYDROLYZED CARBOXYLALKYL CELLULOSE

[76] Inventors: Thomas Berglindh, Ripvägen 5, S-756 53 Uppsala; Anthony de Belder, Nantunavägen 36 F, S-757 57 Uppsala, both of Sweden

[21] Appl. No.: 941,119
[22] PCT Filed: May 3, 1991
[86] PCT No.: PCT/SE91/00317
  § 371 Date: Nov. 4, 1992
  § 102(e) Date: Nov. 4, 1992
[87] PCT Pub. No.: WO91/16906
  PCT Pub. Date: Nov. 14, 1991

[30] Foreign Application Priority Data
  May 4, 1990 [SE] Sweden ............... 90 01592

[51] Int. Cl.⁵ ............... A61K 31/72; C08L 1/28
[52] U.S. Cl. ............... 514/57; 106/197.2; 514/781; 514/867; 536/85; 536/89; 536/97; 536/98
[58] Field of Search ............... 536/85, 89, 97, 98; 106/197.2; 514/57, 867, 781

[56] References Cited

U.S. PATENT DOCUMENTS 4,444,761 4/1984 Spiller ............... 514/867
4,579,943 4/1986 Kamide et al. ............... 536/98

FOREIGN PATENT DOCUMENTS 0189886 6/1986 European Pat. Off. .

OTHER PUBLICATIONS

Danhof, Ivan E., Pharmacotherapy, vol. 2, pp. 18–28 and table 1, (1982).
Pigman, W. W., Chemistry of the Carbohydrates, pp. 530, 532, 545, (1948).
Kennedy, John F., Carbohydrate Chemistry, pp. 48–49; 614, (1988).

Primary Examiner—Ronald W. Griffin
Attorney, Agent, or Firm—Birch, Stewart, Kolasch & Birch

[57] ABSTRACT

A therapeutical composition comprising hydrolyzed carboxyalkyl cellulose, wherein alkyl is methyl, ethyl or propyl, optionally in salt form, which hydrolyzed carboxyalkyl cellulose has a mass average molecular mass from about 200 to about 10,000. A method for providing a laxative effect comprises the administration of such a composition.

12 Claims, 5 Drawing Sheets

THERAPEUTICAL COMPOSITION COMPRISING HYDROLYZED CARBOXYLALKYL CELLULOSE

FIELD OF THE INVENTION

The present invention relates to the use of hydrolyzed carboxyalkyl cellulose as a therapeutical, a therapeutical composition comprising hydrolyzed carboxyalkyl cellulose, methods of preparing such a composition, and the use of hydrolyzed carboxyalkyl cellulose for the manufacture of the therapeutical composition.

BACKGROUND OF THE INVENTION

Laxatives and cathartics are drugs that promote defecation. Whereas laxative effect means the elimination of a soft, formed stool, the term cathartic implies a more fluid evacuation of the bowels. The laxatives can broadly be classified into four major groups, viz. emollient laxatives, bulk-forming laxatives, osmotic laxatives and irritants.

The emollient laxatives, or fecal softeners, are drugs that promote defecation by modest softening of the faeces. Examples are dioctyl sodium sulfosuccinate and some mineral oils.

Bulk-forming laxatives include various natural and semisynthetic polysaccharides and cellulose derivatives. These substances dissolve or swell in water to form an emollient gel or viscous solution that serves to maintain the faeces soft and hydrated. The resulting bulk promotes peristalsis, and transit time is reduced. Examples of bulk-forming laxatives are methylcellulose, sodium carboxymethyl cellulose, and vegetable fibers like Testa Isphaghula.

Osmotic laxatives are small non-absorbable molecules which by osmotic force draw water into the intestines and can either be fast-acting like Glauber's salt ($Na_2SO_4$) or slow-acting like lactulose. From a mechanistic standpoint lactulose must be classified as an osmotic laxative, but the function will be that of a bulk laxative, since water, i.e. a mass, is drawn into the intestine.

Irritants, finally, induce water secretion and bowel mobility by chemical action. Examples are bisacodyl, castor oil, phenolphtalein, and anthraquinone glycosides (Sennosides A and B).

Bulk-forming laxatives like methyl cellulose and sodium carboxymethyl cellulose are hydrophilic semisynthetic cellulose derivatives marketed under various trade names. Their laxative effect is, however, not quite satisfactory. This is reflected by the numerous prior art disclosing the use of carboxymethyl cellulose as a carrier, thickener and additive for compositions with laxative or cathartic action where the pharmacological effect is largely due to the presence of an active agent, e.g. magnesium hydroxide, attapulgite, diphenolisatin; see, for example, EP-A-119 479, GB-A-1 158 169, JP-B-63026692, and FR-A-64982647.

The above mentioned osmotic laxative lactulose is a disaccharide consisting of fructose and galactose. The laxative effect of lactulose is thought to be due to the lower molecular weak acids formed in the degradation of the substance giving a bulk effect by osmotically binding water and thereby exerting a regulating effect upon the peristalsis. Lactulose has, however, several disadvantages in that it is needed in very large quantities, is very slow-acting and that the degradation thereof comprises the formation of substantial amounts of gases, which may cause abdominal pains and also is a social inconvenience.

There is therefore still a need for an efficient slowacting osmotic (bulk-forming) laxative with better efficiency than lactulose and lacking disadvantageous side-effects.

SUMMARY OF THE INVENTION

An object of the present invention is therefore to provide an osmotic laxative which is more efficient than conventional osmotic laxatives, such as lactulose.

Another object of the invention is to provide an efficient osmotic laxative substantially devoid of any detrimental side-effects.

Still another object of the invention is to provide an osmotic laxative which is cheap and readily available.

It has now surprisingly been found that hydrolysis products of carboxyalkyl celluloses, and more particularly hydrolyzed carboxymethyl, carboxyethyl or carboxypropyl cellulose, have remarkable osmotic laxative properties which far exceed those of lactulose and unhydrolyzed native carboxymethyl cellulose (bulk-forming) while substantially being devoid of any detrimental side-effects.

Thus, in one aspect, the present invention provides a therapeutical composition comprising hydrolyzed carboxyalkyl cellulose, wherein alkyl is methyl, ethyl or propyl, said hydrolyzed carboxyalkyl cellulose having a mass average molecular mass ($\overline{M}_W$) from about 200 to about 10 000 and optionally being in salt form. The hydrolyzed product may thus be a hydrolyzed carboxymethyl, carboxyethyl or carboxypropyl cellulose, or mixtures thereof, but also mixed-carboxyalkyl substituted hydrolysis products, such as carboxymethyl/carboxyethyl oligosaccharides, are intended to be encompassed by the invention. The preferred hydrolyzed carboxyalkyl cellulose is hydrolyzed carboxymethyl cellulose. For convenience, carboxymethyl cellulose is hereinafter frequently referred to as CMC, and the hydrolysis product thereof as H-CMC.

In another aspect the present invention provides methods of preparing the therapeutical composition.

In still another aspect the present invention provides a hydrolyzed carboxyalkyl cellulose as defined above for use as a therapeutical, and specifically as a laxative.

In another aspect the present invention provides the use of a hydrolyzed carboxyalkyl cellulose as defined above for the preparation of a laxative composition.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION

Figure 1:
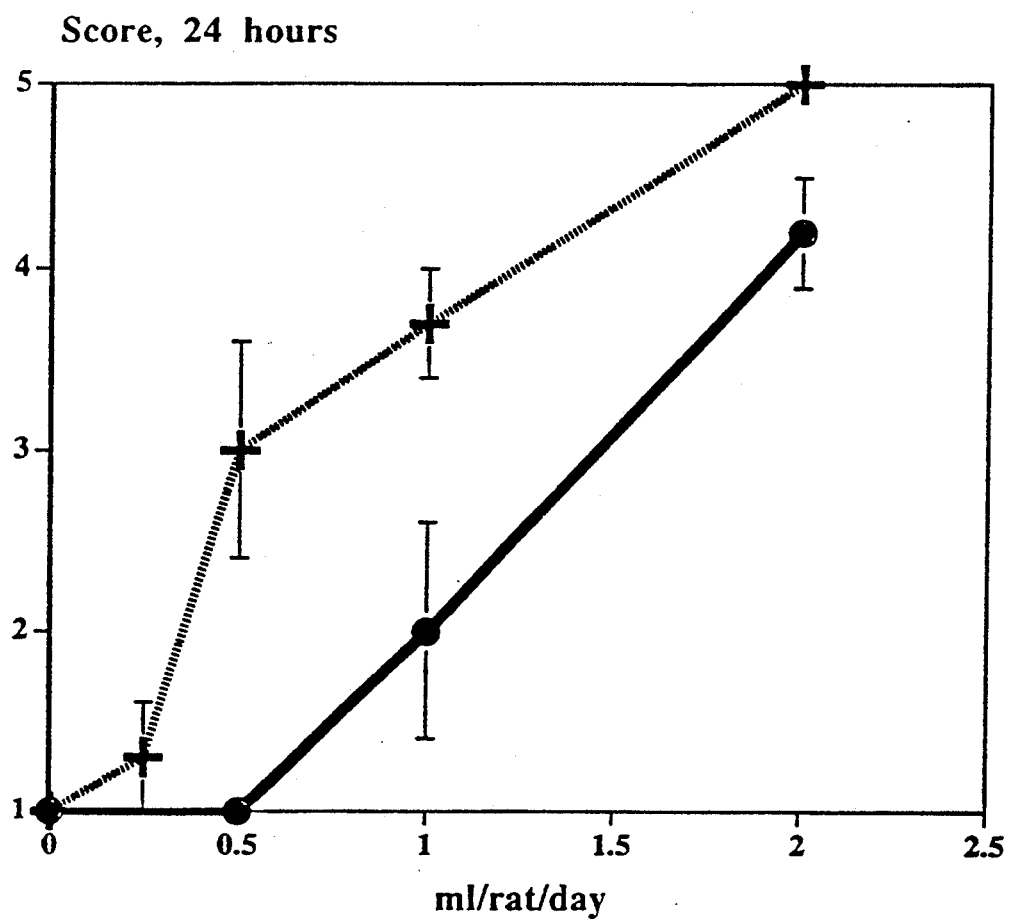
FIGS. 1-3 are dose-response curves for lactulose and hydrolyzed CMC-Na induced diarrhoea in rats after 24, 48 and 72 hours, respectively.

The hydrolyzed carboxyalkyl cellulose product in the laxative composition according to the present invention consists of oligosaccharides of carboxymethyl, carboxyethyl or carboxypropyl cellulose, optionally mixedly substituted, or mixtures thereof, and has a mass average molecular mass ($\overline{M}_W$) from about 200 to about 10 000, preferably from about 300 to about 2000. The hydrolyzed product contains molecules of DP in the range from about 1 to about 50. Preferably, however, the mean DP ($\overline{DP}$) of the hydrolyzed carboxyalkyl cellulose is from about 1 to about 15. The degree of substitution of the hydrolyzed product is preferably from about 0.5 to about 2.5, more particularly from about 1.0 to about 1.5.

The hydrolyzed carboxyalkyl cellulose may be in free acid form or in the form of a pharmaceutically acceptable salt with a monovalent, divalent or trivalent metal, such as the sodium, potassium, calcium, magnesium or aluminium salts, preferably the sodium or magnesium salts.

As will be described in more detail below a laxative composition according to the present invention based upon hydrolyzed CMC (or H-CMC) has proved to be decisively more effective than the prior art osmotic laxative lactulose and bulk-forming laxative CMC (native, unhydrolyzed), respectively. The laxative properties are also clearly superior to those of lactulose when compared on an equal dose relationship. This must be considered as a remarkable finding, since if one assumes that the laxative effect is largely due to the osmotic properties of the substances, then lactulose should be superior to H-CMC. This is illustrated in Table 1 below which shows the theoretical colloid osmotic pressures (COP) for 2% solutions (10 g substance in gut volume volume of 0.5 l) of H-CMC and lactulose, respectively, assuming that none of the substances is resorbed by the gut and that sodium ions may move freely through the gut.

TABLE 1

| Substance | COP (mm Hg) |
|---|---|
| H—CMC (1000) | 570 |
| Lactulose | 1160 |

The hydrolyzed carboxyalkyl cellulose product to be used in the laxative composition of the present invention may be prepared by appropriate depolymerization, such as acid hydrolysis, in per se known manner. The starting carboxyalkyl cellulose may be obtained commercially and should be of food-grade or better quality, or it may be synthesized by reacting a high quality cellulose with chloroacetic acid under alkaline conditions as is well-known in the art. Alternatively, the hydrolyzed carboxyalkyl cellulose may be obtained by hydrolyzing cellulose and subsequently carboxymethylating the resulting hydrolysate.

When carboxyalkyl cellulose is used as starting material it should have a degree of substitution (defined as the number of carboxyalkyl substituents per glucose unit) between about 0.5 and about 2.5, preferably from about 1.0 to about 1.5.

The viscosity of the starting material may range between wide limits, such as from 25 to 4500 mPas (highest values measured at 1% and lowest at 2%) since the duration of the hydrolysis will determine the final molecular weight range.

The depolymerization reactions may be conducted by heating a dilute solution, e.g. 1-20% (w/v), preferably 5-15% (w/v), of the particular carboxyalkyl cellulose, or carboxyalkyl cellulose mixture, with an acid for a suitable period of time. The acid may be a mineral acid or an organic acid. Examples of mineral acids are hydrochloric acid and phosphoric acid, while trifluoroacetic acid and formic acid may be mentioned as examples of organic acids. The preferred acid is dilute hydrochloric acid with a molarity between about 0.05 and about 1.5M, preferably from about 0.1 to about 0.8M. The temperature in the reaction may range from about 50° to about 130° C. but is preferably from about 80° to about 120° C.

When the desired degree of polymerization is attained, as determined by hydrolysis time, the reaction is terminated, for example by precipitation in an organic solvent. Such a solvent is preferably a lower alcohol, such as ethanol or methanol. Alternatively the solvent may be a lower aliphatic ketone, e.g acetone.

The resulting product may then be used for the purposes of the invention in the acid form obtained or neutralized to a salt with an inorganic base or mono-, di- or trivalent metal as mentioned above. Such neutralization may alternatively be performed prior to the above precipitation step. When necessary, the resulting product may be refined further by reprecipitation from aqueous solution into the appropriate organic solvent as outlined above. Further refinement may optionally be carried out with active charcoal.

For therapeutical administration the composition is provided in a suitable pharmaceutical administration form, such as solutions, suspensions, powders, granules, capsules, tablets, optionally with a pharmaceutically acceptable carrier. The quantities to be administered may readily be ascertained by the physician and will, of course, depend on the patient and the particular condition to be treated. In general, however, for an avearge adult human subject, a daily oral dosage regimen would be from about 2 to about 20 grams of the active ingredient.

The invention will now be described in more detail by way of some specific non-limiting examples and biological tests.

EXAMPLE 1

100 g of CMC (Blanose, Batch No. 12M31P, Hercules, Gothenburg, Sweden) were dissolved in 2.3L of 0.4M hydrochloric acid and allowed to hydrolyze at 100° C. for 20 hours. The solution was allowed to cool, neutralized with 2M sodium hydroxide and evaporated to a small volume (about 200 mL) and thereafter precipitated in 3L of ethanol. The precipitate was filtered off, redissolved in 200 mL of water, treated with charcoal at 70° C. for 30 min., filtered and precipitated in ethanol. The resulting material was reprecipitated as above until salt-free which yielded 60 g of product of $\overline{M}_W$ 710 and a mean DP ($\overline{DP}$) of 3.

EXAMPLE 2

3 g of CMC (Blanose, Batch No. 12M31P) were hydrolyzed in 0.4M hydrochloric acid at 90° C. for 24 hours and worked up as in Example 1. Yield 1.7 g, $M_w$ 1997, $\overline{DP}$ 8.

EXAMPLE 3

30 g of CMC (Blanose, Batch No. 12M31PD) were hydrolyzed in 0.4M hydrochloric acid at 100° C. for 20 hours. The cooled hydrolyzate was then neutralized with solid calcium hydroxide and precipitated in 2.5L of ethanol. The product was reprecipitated in ethanol a further 3 times. Yield 20 g, $\overline{M}_W$ 1150, $\overline{DP}$5, 0.11 g $Ca^{++}$ per g substance.

EXAMPLE 4

5 g of CMC (Blanose, Batch No. 9M31F) were hydrolyzed in 1M sulphuric acid at 100° C. for 4 hours. The hydrolyzate was worked up as in Example 1. Yield 2.5 g, $\overline{M}_W$ 640, $\overline{DP}$3.

EXAMPLE 5

80 g of CMC (Blanose, Batch No. 12M31PD) were hydrolyzed according to Example 3. The cooled hydrolyzate was then neutralized with 2M magnesium hydroxide. The volume was reduced and the product precipitated in 10L of ethanol. The product was treated with active charcoal and reprecipitated a further 3 times in ethanol. Yield 37 g, $\overline{M}_W$ 1020, $\overline{DP}$4.

Animal experiments

I. Scoring of laxative effect of H-CMC and Lactulose, respectively

Male Sprague Dawley rats weighing 290–360 g were used. The animals were placed in individual cages under which was placed a sheet of white absorptive paper. The rats were used without previous fasting.

Figure 2:
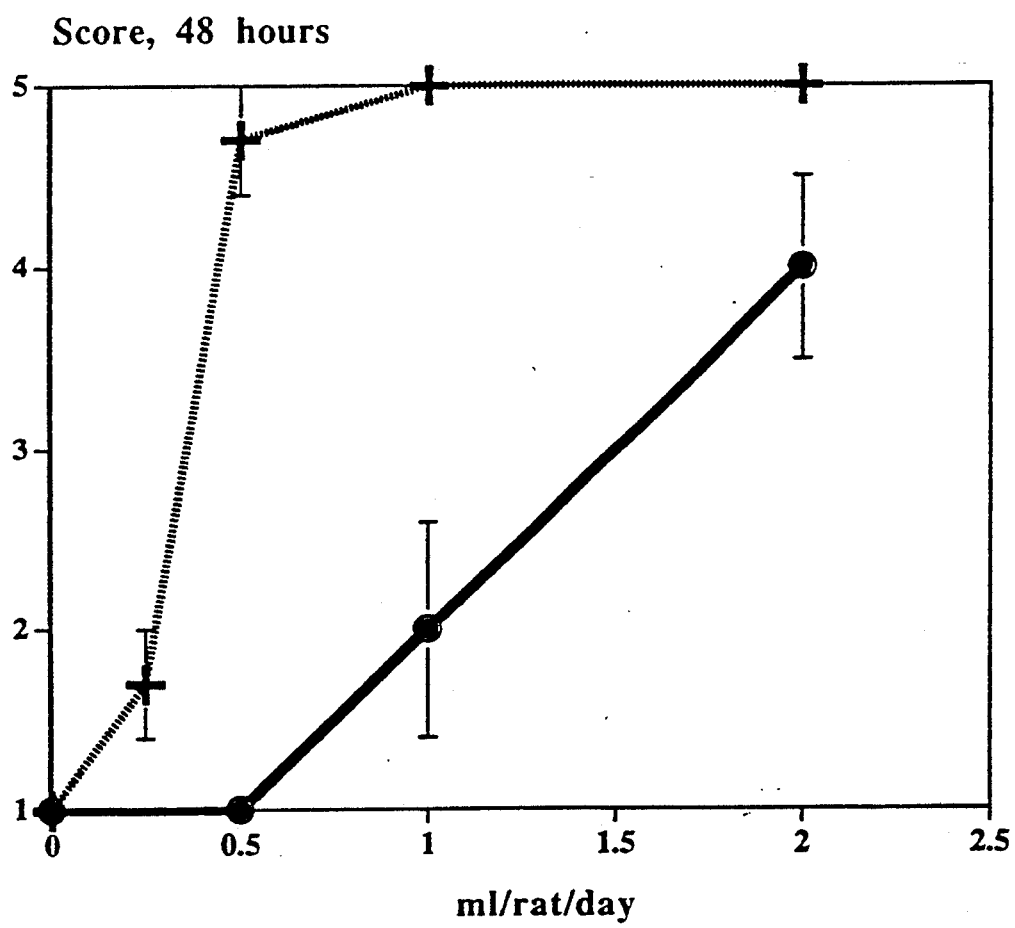
Figure 3:
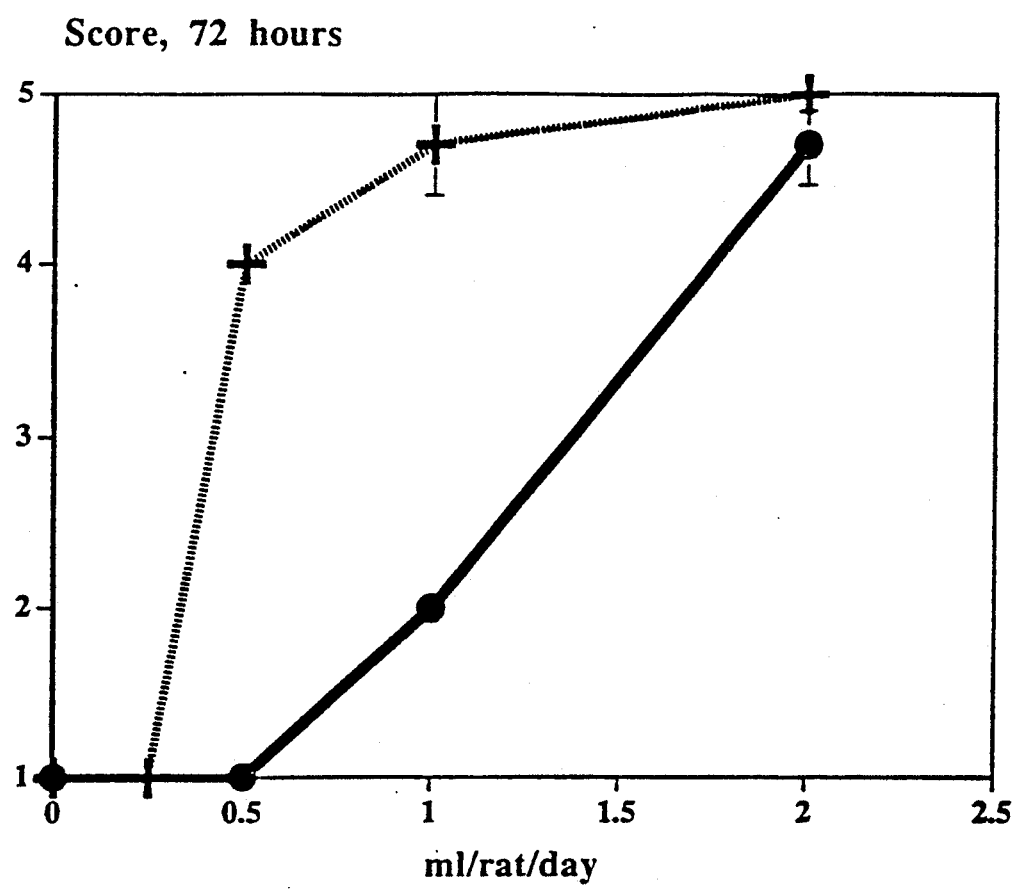
Figure 4:
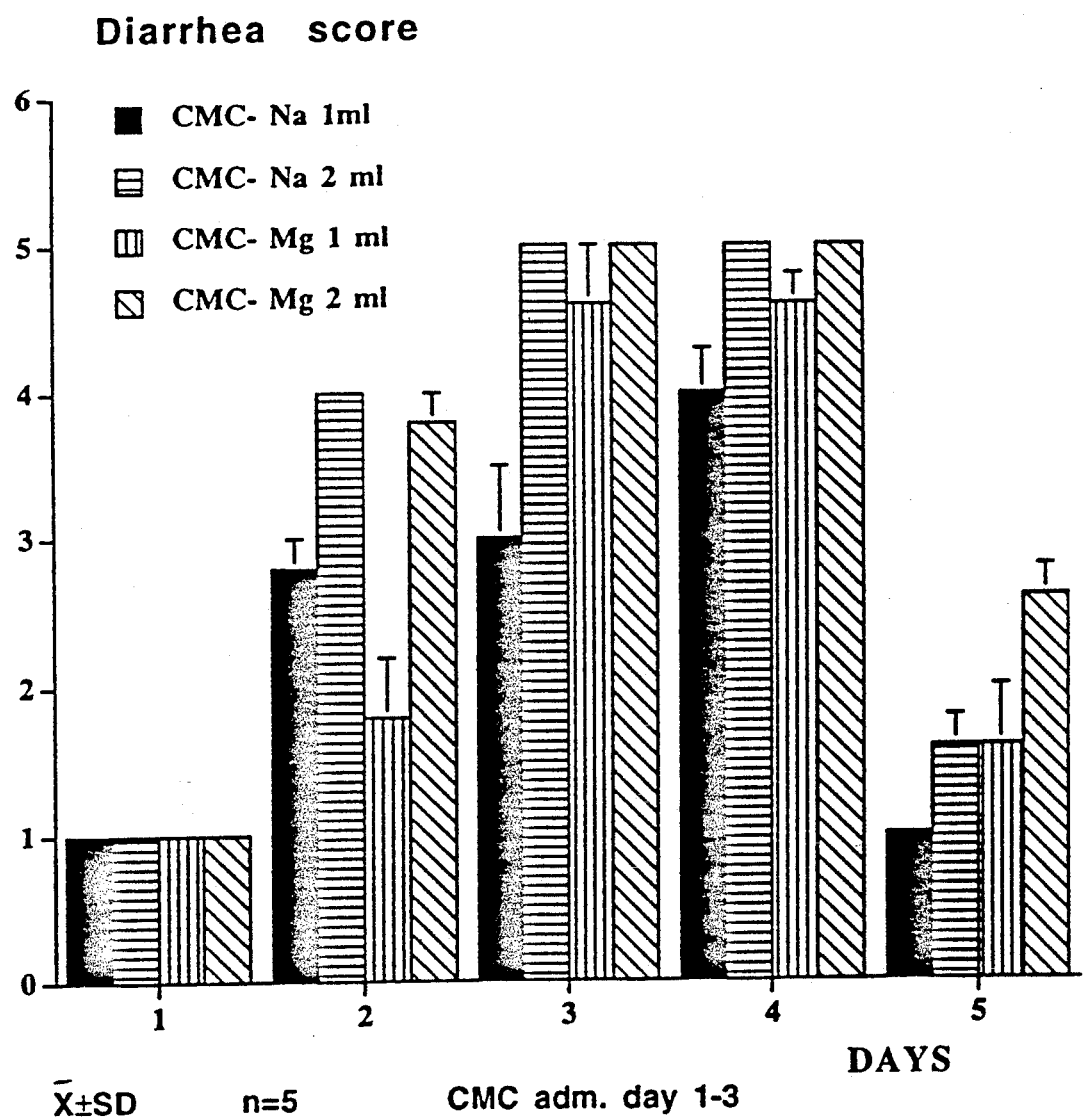
FIG. 4 is a score chart representation of a comparison of hydrolyzed CMC-Mg and CMC-Na induced diarrhoea in rats.

Conscious animals were fed different volumes (0.25–2 mL; 670 mg/mL) of either hydrolyzed CMC prepared as in Example 3 or lactulose (Laktulos, ACO, Sweden) via a gastric sond daily for 3 days. Faeces consistency was assessed on a scale from 1–5 (1=solid faeces; 5=fluid faeces) by two blinded independent observers at 24 hours intervals. Each treatment group consisted of at least 3 animals. The results are shown in FIGS. 1–3, in which "+" represents H-CMC and "●" represents lactulose.

From the results of the first administration (FIG. 1) it is clear that H-CMC is significantly more potent than lactulose. This trend is further emphasized during the following days (FIGS. 2 and 3) where it is seen that H-CMC is approximately 4 times more potent on a weight for weight basis. Only by the third day had the highest lactulose dose (2 mL) induced total diarrhoea (score 5), whereas H-CMC had attained a score of 5 already at 0.5 mL on the second day.

II. Effect of native CMC and H-CMC-Na, respectively, on rat intestine

Male rats, Sprague-Dawley, on a fibre-poor diet and having a weight of about 350 g were divided into four groups. Two groups of four animals each were fed native CMC (N-CMC) (Blanose, Batch No. 12M31PD), and two groups of five animals each were fed hydrolyzed CMC-Na of $\overline{M}_W$ 978 and produced as in Example 1 above from the same CMC-batch as the native CMC used in the study. The rats were put in individual cages having grid bottoms. Under each grid bottom a paper sheet was placed where the faeces could be determined, such determination being made 24 hours after probing. The rats were probed for three consecutive days, and their faeces were estimated each day during the probing period as well as the day after. Further, a control value was determined prior to starting the experiment.

The scoring of the faeces was made with integer values between 1 and 5, a score =1 corresponding to normal faeces and a score =5 indicating an exclusively watery diahorrea, and values therebetween representing various degrees of effect on the intestine. This scoring was made by the personnel of the animal department (two independent observers).

The rats were fed 335 mg and 168 mg/day, respectively, of hydrolyzed CMC-Na, and 670 mg/day of native CMC. In total 14 mL/day were administered in two lots with 7 mL per lot and with an interval of one hour. Statistical significance was determined with the Wilcoxon Rank Sign Test, one-tailed for comparisons of the same type of CMC, otherwise two-tailed. The results are shown in FIG. 5.

Figure 5:
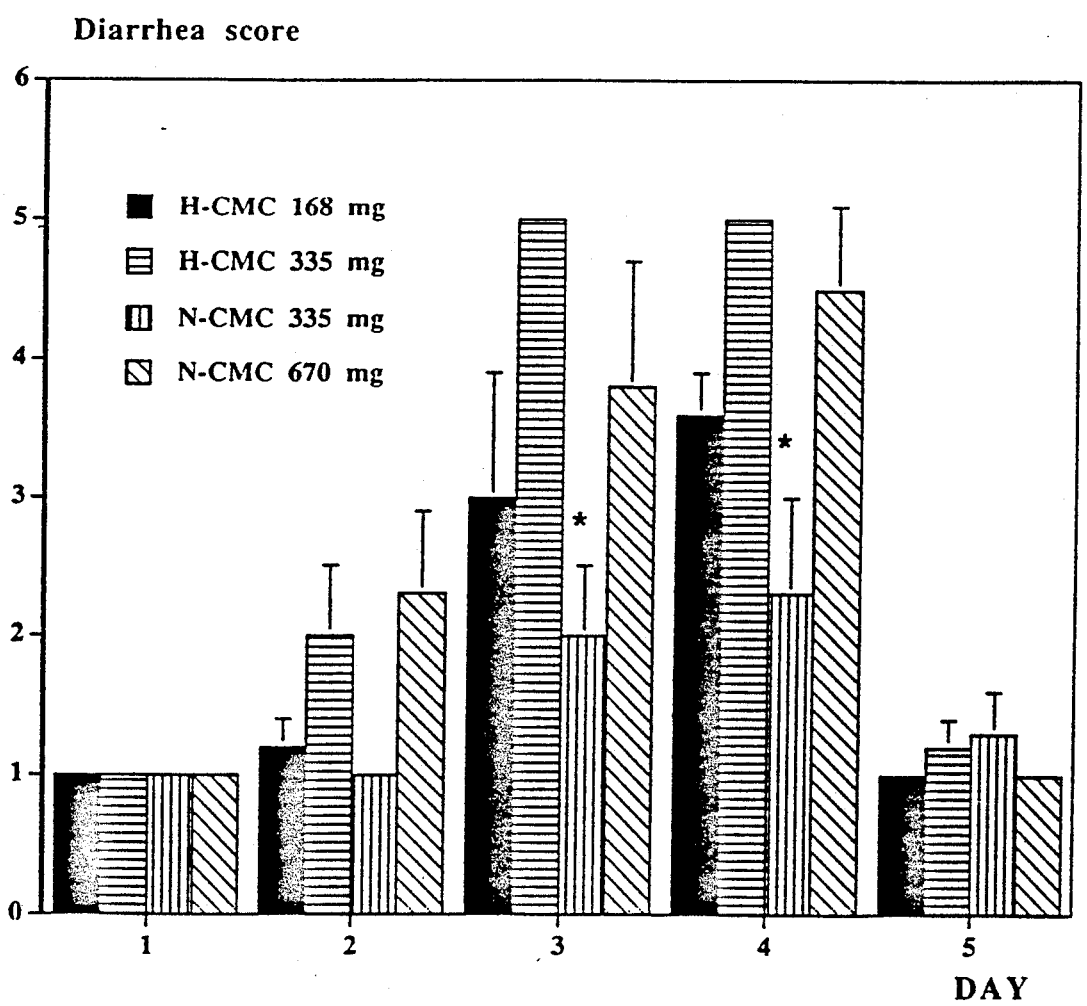
FIG. 5 is a score chart representation of a comparison of hydrolyzed CMC-Na and native CMC induced diarroea in rats.

From FIG. 5 it can be seen that both native and hydrolyzed CMC produce a dosage-dependent response. Days 3 and 4, H-CMC (335 mg) was significantly better than the corresponding amount of CMC ($p<0.05$). Also 168 mg of H-CMC gave a better effect than 335 mg of N-CMC days 3 and 4, the difference, however, not being significant. N-CMC at 670 mg was less potent than H-CMC at 335 mg and slightly more potent than H-CMC at 168 mg. It is therefore clear that hydrolyzed CMC is significantly better than native CMC at 335 mg, and that there is no significant difference between 168 mg of hydrolyzed CMC and 670 mg of native CMC. Thus, hydrolyzed CMC is 2–4 times more potent than native CMC as a laxative.

We claim:

1. A therapeutical composition, characterized in that it comprises hydrolyzed carboxyalkyl cellulose, wherein alkyl is methyl, ethyl or propyl, or a salt thereof, said hydrolyzed carboxyalkyl cellulose having a mass average molecular mass ($\overline{M}_W$) from about 200 to about 10,000.

2. A therapeutical composition according to claim 1, characterized in that the hydrolyzed carboxyalkyl cellulose has an $\overline{M}_W$ from about 300 to about 2000.

3. A therapeutical composition according to claim 1 or 2, characterized in that the hydrolyzed carboxyalkyl cellulose has a degree of substitution from about 0.5 to about 2.5.

4. A therapeutical composition according to claim 1 or 2 characterized in that the hydrolyzed carboxyalkyl cellulose is selected from the group consisting of hydrolyzed carboxymethyl, carboxyethyl and carboxypropyl celluloses, and mixtures thereof.

5. A therapeutical composition according to claim 4, characterized in that the hydrolyzed carboxyalkyl cellulose is hydrolyzed carboxymethyl cellulose.

6. A method of preparing a therapeutical composition according to claim 1, characterized in that it comprises the step of depolymerizing a corresponding aqueous carboxyalkyl cellulose by acid hydrolysis.

7. A method of preparing a therapeutical composition according to claim 1, characterized in that it comprises the steps of depolymerizing an aqueous unsubstituted cellulose by acid hydrolysis and carboxyalkylating the resulting hydrolyzed cellulose.

8. A method according to claim 6 or 7, characterized in that said acid hydrolysis is performed with a mineral acid.

9. A method of claim 8, wherein the mineral acid has a molarity from about 0.05 to about 1.5.

10. A method for the treatment of a patient which comprises administering to said patient a therapeutic composition having laxative activity comprising hydrolyzed carboxyalkyl cellulose wherein alkyl is methyl, ethyl or propyl, or a salt thereof and having a mass average molecular mass ($M_W$) from about 200 to about 10 000.

11. A method of providing a therapeutic laxative effect in a mammalian subject, characterized by orally administering a therapeutical composition according to claim 1 or 2.

12. Hydrolyzed carboxyalkyl cellulose, wherein alkyl is methyl, ethyl or propyl, or salts thereof, and having a mass average molecular mass ($\overline{M}_W$) from about 200 to about 10 000, for use as a therapeutical.

* * * * *